United States Patent [19]
Patchen

[11] 3,785,459
[45] Jan. 15, 1974

[54] LUBRICATION AND COOLING SYSTEM FOR CONNECTING ROD AND PISTON

[75] Inventor: Paul J. Patchen, Chicago, Ill.

[73] Assignee: Allis-Chalmers Corporation, Milwaukee, Wis.

[22] Filed: May 11, 1972

[21] Appl. No.: 252,366

[52] U.S. Cl. .................. 184/6.5, 92/157, 308/78
[51] Int. Cl. ............................................. F01m 1/06
[58] Field of Search .................. 92/157; 184/6.5, 184/6.28; 308/78

[56] References Cited
UNITED STATES PATENTS

| | | | |
|---|---|---|---|
| 2,449,657 | 9/1948 | Kishline | 92/157 |
| 2,899,016 | 8/1959 | Swayze | 184/6.5 |
| 3,495,685 | 2/1970 | Rinsum | 184/6.5 |
| 2,991,769 | 7/1961 | Chapin | 92/157 X |
| 3,555,972 | 1/1971 | Hulsing | 92/157 |
| 2,192,782 | 3/1940 | Westfield | 184/6.5 |
| 1,948,340 | 2/1934 | Dolza et al. | 184/6.5 |

FOREIGN PATENTS OR APPLICATIONS 1,025,674  3/1958  Germany .......................... 184/6.5

*Primary Examiner*—Manuel A. Antonakas
*Attorney*—Arthur L. Nelson et al.

[57] ABSTRACT

A lubricating and cooling system for lubricating a connecting rod and cooling the underside of a piston of an internal combustion engine.

16 Claims, 10 Drawing Figures

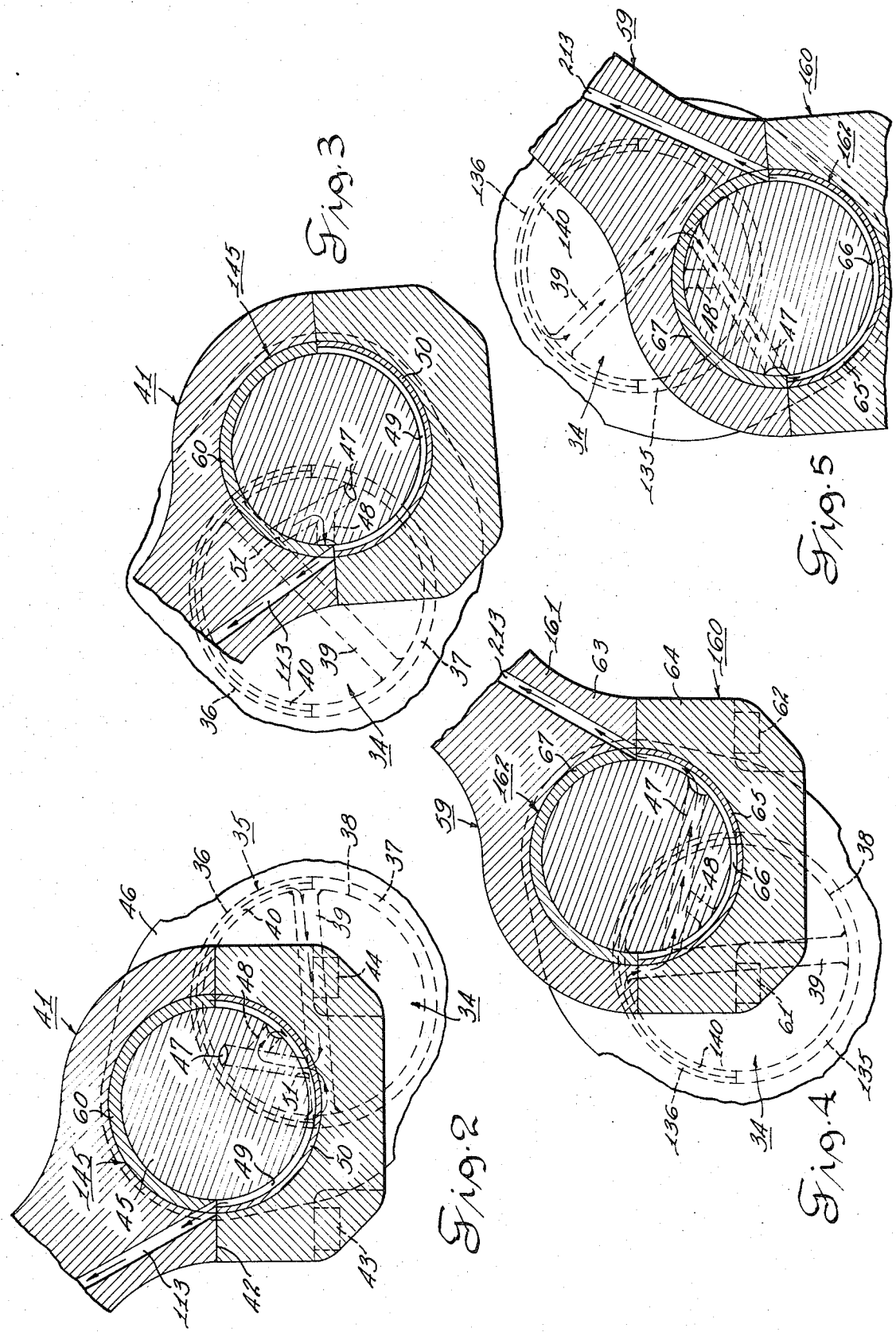

LUBRICATION AND COOLING SYSTEM FOR CONNECTING ROD AND PISTON

This invention relates to internal combustion engines and more particularly to a lubrication and cooling system for lubricating the crankshaft bearings and wrist pin bearings and cooling the underside of a piston.

The reciprocating internal combustion engine has used various types of lubricating systems for lubricating the bearings of the crankshaft and the wrist pin bearing. Forced lubricating systems generally include a drilled crankshaft with a drilled connecting rod usually drilled on the axial center of the rod to convey lubricating oil from the crankshaft to the wrist pin bearing. The main bearings, the crankpin bearings, and the wrist pin bearings generally define oil grooves for improving the lubrication characteristics of the bearing per se as well as transmission of lubricating and cooling oil through the connecting rod for cooling the underside of the piston. The disadvantage of the conventional method of piston cooling is in its characteristic oil delivery curve. Maximum oil flow is achieved at its lowest operating speed and diminishes as the speed increases thereby providing a negative slope for the oil delivery engine speed curve. This establishes a need for an exceedingly large oil pump capacity to maintain oil pressure at low speeds and yet rarely provides the desired flow rate for piston cooling at full load speeds. This is particularly true in the engines of higher speed operation. Accordingly, it is desirable to improve the flow characteristics of the lubricating oil with the engine speed to provide the necessary oil pressure for lubrication of the bearings as well as piston cooling. This can be accomplished by providing a single oil supply hole in the crankpin bearing in conjunction with a partially grooved bearing shell to function as a rotary valve. Through proper orientation communication is provided when positive flow conditions exist and communication is terminated when the negative flow conditions exist to increase the net flow at full load speed. This same arrangement provides communication one-half or less of the time reducing delivery under conditions when negative flow conditions do not appear in the operating cycle to decrease the flow rate at low idle speeds. Thus, flow is increased at full load speed and reduced at low idle speed, over that produced by the natural delivery curve, when communication is continuous, to provide a positive slope of the delivery curve. More specifically, this lubricating and cooling system provides asymmetrical timing. This provides a minimum communication period or duration of flow rate in degrees of crank rotation for a given flow rate at full load speed. Likewise, this minimum communication period provides a maximum positive slope or reduction in flow rate as the engine speed is reduced to low idle.

More specifically, lubrication oil flow is produced by main oil gallery pressure, pressure due to crankshaft rotation, and alternating positive and negative pressure due to connecting rod reciprocation. At low idle speed the net pressure producing flow is the summation of the positive main oil gallery pressure and the positive crankshaft produced pressure in conjunction with a weak fluctuating positive and negative pressure produced by connecting rod reciprocation. Under these conditions a positive pressure persists and the flow is continuous resulting in high flow rate if uncontrolled.

At full load speed the net pressure producing flow is a summation of the increased positive main gallery pressure, increased crankshaft rotation producing pressure and a strong fluctuating positive and negative pressure produced by connecting rod reciprocation. Under these conditions both positive and negative net pressure periods exist which diminish the positive flow rate. This is due to the fact that net flow is the algebraic sum of positive and negative flow periods of a cycle and the negative flow subtracts from the positive flow resulting in the decreased net delivery. Through careful selection of timing to provide the required flow rate at full load speed with minimum duration, maximum positive slope of the delivery curve is attained to provide minimum flow rate at low idle speed.

Accordingly, this invention provides asymmetrical timing of essentially a rotary valve in any bearing between the main oil gallery pressure at the main bearing and a lubrication oil spray on the underside of the piston to provide a positive flow rate with increase in engine speed.

It is an object of this invention to provide a lubricating and cooling system for an internal combustion engine having a drilled hole in the crankshaft and a bearing shell groove in communication with each other primarily during the down stroke of the connecting rod.

It is another object of this invention to provide asymmetrical timing for oil flow through the connecting rod to provide increased flow of cooling oil as the engine speed increases.

It is a further object of this invention to provide initiation of communication between the main bearing and the cooling jet of the connecting rod within a range of approximately 45° before top dead center and for maintaining communication for the range of approximately 90° and 180° of crankshaft rotation through a rotary valve means.

It is a further object of this invention to provide maximum load carrying capacity for the crankpin bearing by eliminating the interruption of the bearing surface caused by the conventional oil groove on the major thrust portion of the main bearing or crankpin bearing of the crankshaft.

The objects of this invention are accomplished by providing a main bearing journal on the crankshaft with an oil groove for at least a portion of the periphery of the journaled portion of the crankshaft. An oil passage is formed in the crankshaft between the journaled portion on the main bearing and a journaled portion on the crankpin to supply oil to an oil groove formed in the crankpin end of the connecting rod. The oil groove on the crankpin portion of the connecting rod intermittently controls communication between the main oil gallery pressure and an oil passage transmitting oil to the wrist pin bearing for spraying the underside of the piston. Asymmetrical timing of a valve means controls the flow of oil for cooling the underside of the piston during the period of time the inertia forces of the oil column aid in increasing the oil pressure at the wrist pin bearing and terminate communication when the inertia forces in the oil passage of the connecting rod oppose the main gallery oil pressure to thereby provide a positive oil delivery flow with increase in engine speed.

Referring to the drawings, FIG. 1 illustrates a cross section view of an in-line engine having a bearing split on the crankpin bearing normal to the axis of the connecting rod.

3

FIG. 2 illustrates a cross section view of the right bank of a V-engine having lubrication passage opening at 40° before top dead center with a 180° oil groove in the crankpin bearing.

FIG. 3 illustrates the right bank connecting rod as shown in FIG. 2 at the termination of communication of the lubrication oil passages in the crankpin bearing.

FIG. 4 illustrates the left bank of a V-engine with lubrication passage opening at 40° before top dead center and 180° lubrication groove in the crankpin bearing.

FIG. 5 is a view similar to FIG. 4 with the crankshaft rotated to terminate communication of the lubrication oil passages.

Figure 1:
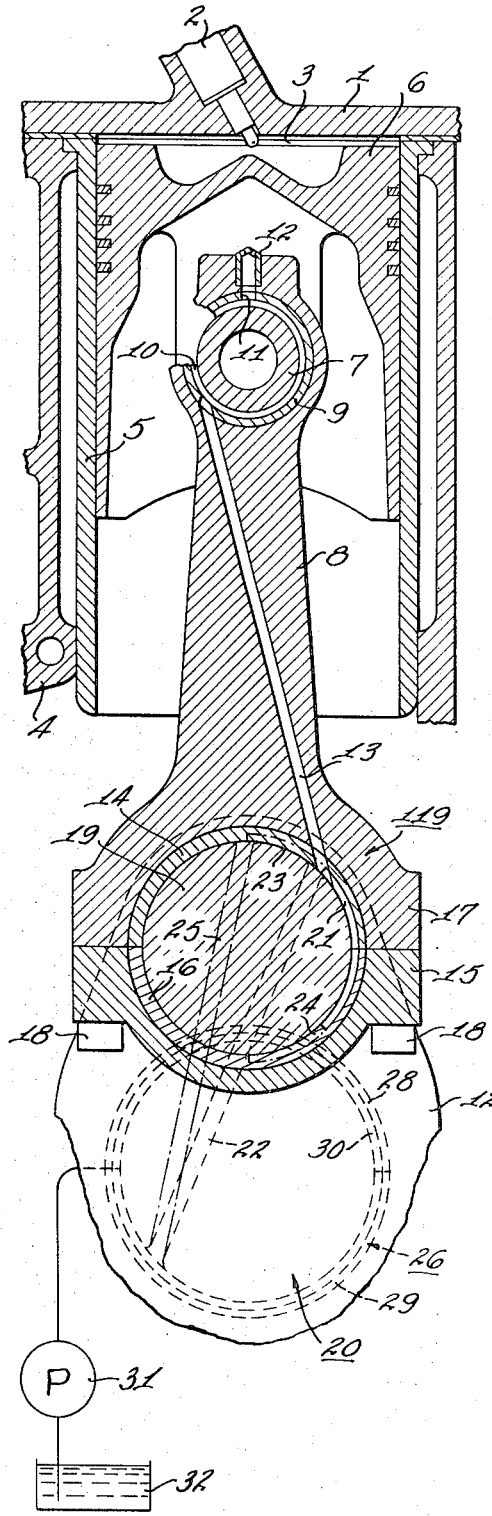

Referring to the drawings, FIG. 1 illustrates an in-line engine. The engine includes a head 1 supporting a fuel injector 2 for injection of fuel into the combustion chamber 3. The engine block 4 receives a sleeve liner 5. The piston 6 reciprocates within the liner 5 when the engine is in operation.

The piston 6 is connected by a wrist pin 7 to the connecting rod 8. The connecting rod 8 contains a bushing 9 forming an annular oil groove 10 on its inner periphery. The oil groove 10 is connected through the bore 11 to the spray orifice 12 for spraying the underside of the piston 6.

A connecting rod 8 forms a diagonal passage 13 extending through the shank of the connecting rod and through a portion of the bushing 9 to provide communication to the annular groove 10. The crankpin bearing 119 of the connecting rod 8 forms a bearing split which is normal to the longitudinal axis of the connecting rod. The rod end of the crankpin bearing receives a bearing shell 14 while the cap end 15 receives a bearing shell 16. The cap end 15 is connected to the rod end 17 by means of a plurality of bolts 18.

The crankpin 19 of the connecting rod 8 is received within the bearing shells 14 and 16. For the purpose of illustration, the bearing shells 14 and 16 are interchangeable and form a total lubrication groove of 90° in the crankpin bearing 119. Accordingly, each bearing

4 shell has a groove extending for 45° which are in communication with each other.

The groove 21 is in continuous communication with the lubrication oil passage 13 and intermittently in communication with the passage 22 which is formed in the crankarm 120 of the crankshaft 20 and extends from the main bearing 26 to the crankpin bearing 119.

It is understood that the crankpin bearing groove 21 might be extended to include an arc of 180° as shown by the groove extension 23 in the bearing shell 14 and the groove extension 24 in the bearing shell 16 shown in phantom. Likewise, the passage 22 may be used in combination with oil groove 21 to initiate communication in the passages transmitting lubricating oil at an earlier point in time; in other words, 45° earlier. Likewise, a phantom passage as shown by passage 25 in the crankshaft may be used which would initiate communication between the passage 13 and the crankshaft passage 25 at top dead center and continue communication 180°.

Accordingly, it is understood that initiation or termination of communication between the main bearing and the spray orifice 12 is controlled by suitable drilling of the crankshaft together with oil grooves cut in the bearing shells 14 and 16. Initiation of the timing of this initial communication can be varied by any point of crankshaft rotation, and the duration of the communication may also be controlled to any length of time so desired to provide the desired oil flow rate with response to engine speed.

The main bearing 26 includes the upper and lower sections of the bearing shells 28 and 29 respectively. For the purpose of illustration, the main bearing 26 as shown in FIG. 1 has a peripheral groove 30 for a full 360°. The oil passage 22 in the crankshaft is in communication with the oil groove 30 continuously and intermittently in communication with the oil groove 21 of the crankpin bearing 119 as the crankshaft rotates.

A lubrication oil pump 31 operates in response to engine rotation and receives oil from oil reservoir 32. The engine lubricating and cooling oil is returned to the reservoir 32 as it is circulated through the lubrication and cooling system.

Referring to FIGS. 2 and 3, the right bank of the V-engine crankshaft and connecting rod is shown. It is assumed that a cooling and lubricating construction as shown in FIG. 1 may be used in connection with the V-engine components shown in FIGS. 2 and 3. It is understood that the right bank of cylinders of the V-engine is on the righthand side of the engine and facing forwardly, and accordingly, the section as shown in FIGS. 2 and 3 are looking rearwardly. The right bank is shown at a 45° angle to a vertical in FIGS. 2 and 3. Accordingly, the left bank of the V-engine is shown at 45° to a vertical in FIGS. 4 and 5 since the V-angle of the engine described is a 90° V.

The crankshaft 34 includes a main bearing 35 including upper shell 36 and lower shell 37. The journaled portion 38 of the crankshaft 34 has a cross passage 39 drilled diametrically through the crankshaft. The upper bearing shell 36 defines a 180° oil groove 40 and with the cross drilled diametrical passage 39, the oil groove 40 is in continuous communication with the passage 39. The cross passage 39 and oil groove 40 are connected to a suitable lubrication pump driven by the engine which provides the main oil gallery pressure.

The connecting rod 41 has a diagonal split 42 at 45° to the longitudinal axis of the connecting rod 41. With the connecting rod 41 having a diagonal split 42 at 45° and the right bank of the V-engine on a 90° V, the bolts 43 and 44 can be conveniently removed from the underside of the engine, if necessary, for repair.

The crankpin 45 is connected through the crankarm 46 to the journaled portion 38 of the crankshaft in the main bearing.

The groove 40 in the bearing shell 36 is in constant communication with the lubrication oil passage 39 which is connected to the passage 47 through opening 51 in the crankarm 46. The passage 47 is also connected to a passage 48. The passage 48 is in communication with the oil groove 49 in the lower bearing shell 50. The upper bearing shell 60 has a smooth continuous surface to carry heavier loads of thrust from the connecting rod 41. It is understood that the passage 47 is in communication with passage 48, but passage 48 is the outlet passage for the right bank of the engine through connecting rod 41. The passage 47 transmits lubrication fluid to the left bank as shown in FIGS. 2 and 3.

FIG. 3 illustrates the crankshaft rotated to where the passage 48 terminates communication with the oil groove 49 in bearing shell 50. The communication between the passage 48 and the groove 49 in bearing shell 50 initiates at 40° before top dead center and terminates at 140° after top dead center. It is understood that top dead center refers to top dead center for the right bank and is illustrated in FIG. 2 with the engine crankshaft 34 at top dead center.

Figure 9:
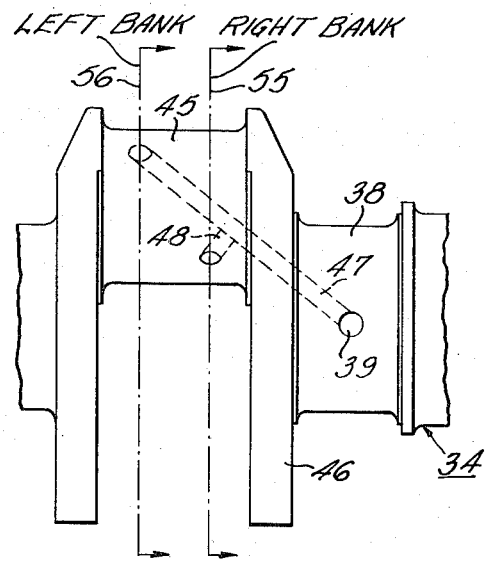
FIG. 9 is a fragmentary side view of the crankshaft showing lubrication oil passages from the journaled portion in the main bearing to the journaled portion in the crankpin bearing and the planes of the views shown in FIG. 2 and 3 as well as FIGS. 4 and 5 for the right and left banks of the V-engine.

Referring to FIGS. 4 and 5, one of the left bank of cylinders is illustrated in a cross section as cut in the plane 56 as shown in FIG. 9. It is understood that the right bank are illustrated by a cross section as cut at plane 55 as shown in FIG. 9 and as illustrated in FIGS. 2 and 3.

The connecting rod 59 of the left banks as shown in FIGS. 4 and 5 is essentially rotated at 180° on axis, as compared to the connecting rod 41 of the right bank shown in FIGS. 2 and 3. With the 90° V of the engine banks of cylinders and a 45° diagonal split of the bearings on the crankpin end of connecting rod 59, the bolts 61 and 62 extend downwardly to provide a fastening means for the rod end 63 and the cap end 64 to permit access for repair.

The cap 160 receives a bearing shell 65 which forms a recess 66. The rod end 161 of crankpin bearing 162 receives the shell 67 with an uninterrupted surface to carry heavy thrust loads.

Passage 47 is in communication with the oil groove 66 of the bearing shell 65 for 180° of rotation since the lower bearing shell forms an oil groove of 180°. The passage 47 initiates communication with the groove 66 at 40° before top dead center of the left bank cylinder as shown. The passage 47 is in continuous communication for 180° and then is interrupted by the continuous surface of the bearing shell 67 as the crankshaft continues to rotate.

A thrust load from the connecting rod 59 is transmitted to the journal portion 38 of the crankshaft 34. The main bearing journaled portion 38 includes a lower shell 135 which has a continuous surface to receive heavy thrust loads from the journaled portion 38. The upper shell 136 forms a groove 140 for 180° of arc. With the cross passage 39 extending diametrically through the journaled portion 38 of the crankshaft 34, the groove 140 is in continuous communication with the passage 39. Accordingly, it can be seen that the engine provides a bearing at the crankpin and also the journaled portion of the crankshaft at the main bearing to carry heavy thrust loads. The initiation and termination of communcation between the main oil gallery supply and the spray orifice 12 is controlled by suitable drilling of the crankshaft and grooving of the bearing shells for providing heavy thrust loads while still maintaining communication between the oil pressure of the main oil gallery to the spray orifice as desired.

Figure 10:
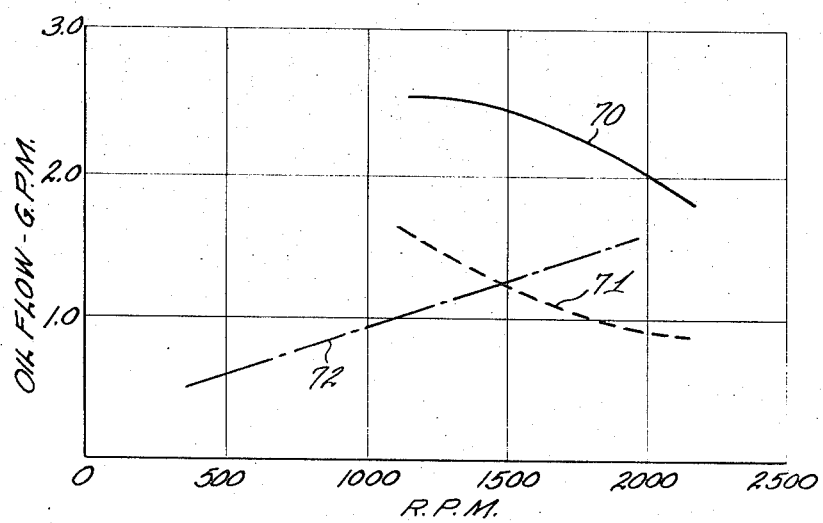
FIG. 10 is a graph illustrating oil flow in gallons per minute of conventional engines with continuous communication in the lubricating oil passages from the main gallery pressure at the main bearing to the jet spraying the underside of the piston as contrasted to the oil flow for a system as covered by this invention.

Referring to FIG. 10, the graph illustrates lubrication and cooling oil flow in gallons per minute with relation to the engine speed in revolutions per minute of engines having contrasting oil flow systems. The line 70 illustrates a negative flow characteristic as engine speed increases of an engine having main oil gallery pressure continuously applied through crankshaft and connecting rod passages which is an unfavorable flow characteristic. As previously indicated the inertia forces on the oil columns in the crankshaft and connecting rods are allowed to produce this undesirable result.

The line 71 also illustrates a negative flow characteristic of a similar engine with continuous communication between the main oil gallery supply and the spray orifice 12. Conversely, the line 72 in FIG. 10 illustrates a positive flow characteristic for a multi-cylinder engine in which an increasing flow in gallons per minute is associated with an increase in speed of the engine. The flow characteristic shows the results of proper oil flow control of essentially a rotary valve positioned in the crankpin bearing of the engine.

Figure 6:
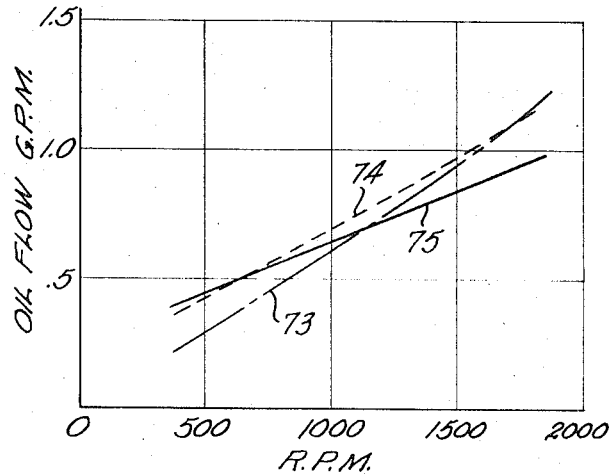
FIG. 6 is a graph illustrating oil flow in gallons per minute as related to engine speed in revolutions per minute with oil passage opening at 30° before top dead center, and an oil groove in the crankpin bearing of lengths 90°, 120° and 150°.

FIG. 6 illustrates flow characteristics of an engine with varying groove lengths in the crankpin bearing shell. The initiation of communication between the main gallery oil supply and the spray orifice at the top of the wrist pin is 30° before top dead center. The dot-dash line 73 illustrates oil flow with a groove length of 90°. The dotted line 74 illustrates oil flow with a groove length of 120°, while the solid line 75 illustrates oil flow with a groove length of 150°.

Figure 7:
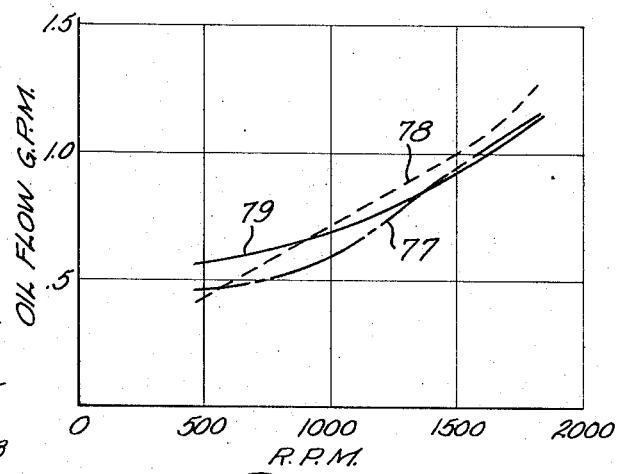
FIG. 7 is a graph illustrating oil flow in gallons per minute with relation to engine speed in revolutions per minute with lubrication oil passage opening at 45° before top dead center and oil grooves in the crankpin bearing with lengths of 90°, 120° and 150°.

Referring to FIG. 7, the graph illustrates a similar oil flow chart in which communication initiation of the lubricating oil passages between the main oil gallery supply and the spray orifice is initiated at 45° before top dead center. The dot-dash line 77 illustrates oil flow with a 90° arc of oil groove while the dash line 78 illustrates oil flow with a 120° arc of oil groove and the solid line 79 illustrates oil flow with a 150° arc of oil groove. All of the variations in the length of oil groove in the bearing shell illustrates a positive flow characteristic with engine speed.

Figure 8:
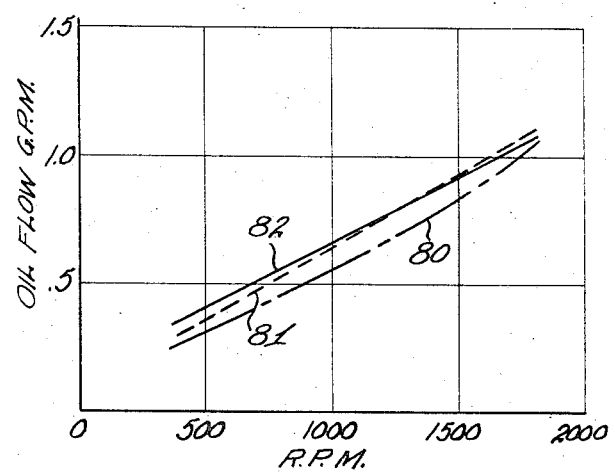
FIG. 8 illustrates a graph showing oil flow in gallons per mintue with relation to engine speed in revolutions per minute with lubrication passage opening at 60° before top dead center and oil groove lengths of 90°, 120° and 150° in the crankpin bearing.

Referring to FIG. 8, a similar oil flow chart is illustrated. The initiation of communication between the main oil gallery supply and the spray orifice is at 60° before top dead center. The dot-dash line 80 illustrates the results of oil flow with 90° oil groove arc, while the dash line 81 illustrates oil flow with 120° of oil groove arc, while the solid line 82 illustrates oil flow with 150° of arc in the bearing shell. All of the charts illustrate a positive flow characteristic with increase in engine speed. While the various charts illustrate a variation in the rate of the oil flow characteristic, it was concluded that asymmetrical timing for the initiation and termination of oil transmission through the connecting rod was necessary. Start of communication was preferred not to be earlier than 40° before top dead center or later than top dead center and continuing for not less than 90° or for more than 180°. By varying the initiation and termination of communication to provide oil flow though the connecting rod, the desired rate and flow characteristics may be achieved. The rotary valve action produced by the crankpin bearing provides a positive way of improving the flow characteristic while simultaneously improving the thrust load which the connecting rod and crankshaft are able to transmit through the engine.

The operation of this device will be described in the following paragraphs.

Referring to FIG. 1, the crankshaft 20 is rotatably mounted and rotatably connected through the crankpin 19 to the connecting rod 8. The connecting rod 8 is connected through the wrist pin 7 to the piston 6. As the crankshaft rotates, the pump 31 supplies pressurized oil to the groove 30 of the bearing shells 28 and 29 in the main housing 26. Bearing shells 28 and 29 form a continuous groove for the periphery of the bearing. The passage 22 extends through the crankarm of the crankshaft 20 to the crankpin bearing 119. The crankpin bearing is formed with two bearing shells 14 and 16 which form an oil groove 21 at adjacent ends of the bearing shells. The oil groove 21 is in communication with the diagonal passage 13 in the connecting rod which extends to the wrist pin bearing 120 and is in communication with the oil groove 10 and bore 11 to spray lubrication and cooling oil on the underside of the piston 6 through the spray orifice 12. While the crankshaft 20 is rotating the connecting rod 8 is reciprocating and a column of oil in the passage 13 increases and decreases the effective oil pressure at the spray orifice 12. During at least a portion of the phase of the cycle while the inertia forces on the oil in the passage 13 increase the algebraic sum of all pressures which include the pressure of the main oil gallery, and the pressure produced by the rotational force on the oil in the passage 16, communication is provided through the rotary valve structure of the crankpin bearing 119. Communication is provided from the main bearing through the crankpin bearing through the wrist pin bearing to the spray orifice 12. This communication initiates, as shown in FIG. 1, at approximately top dead center. The communication continues for approximately 90° as shown, at which point communication is terminated.

Also illustrated in FIG. 1, provision for extending the oil groove length in the shells 14 and 16 is shown in the phantom view. In the phantom view of the oil groove initiation of communication is at 45° before top dead center and continues for the length of the arc of 180° of the oil groove. At this point communication is terminated and for 180° no oil passes through the passage 13. The oil column in passage 13, however, has an inertia effect which will tend to continue to lubricate the crankpin bearing from the upper side since a negative pressure forcing downwardly will cause some lubrication of the bearings. It is understood that the wrist pin bearing 9 has a 360° groove for lubricating and cooling.

Referring to FIGS. 2, 3, 4 and 5, the crankshaft shown operates in conjunction with a V-engine. The lubrication system operates similarly to that shown in FIG. 1; however, initiation and termination of lubrication oil passages as shown in FIG. 9 operate at a different time in the crankshaft rotation. Initiation for each bank of cylinders is at 40° before top dead center and continues for 180° of crank rotation and then terminates. This is illustrated in each of the views shown for the V-engine. The system as shown also provides a cross drilled passage 39 in the portion 38 of the crankshaft. This permits smooth continuous bearing surfaces to carry heavier thrust loads on the main bearing as well as the crankpin bearing. By supplying lubricating oil continuously to the main bearing and through the cross passage 39 and intermittently through the crankpin bearing 145 and 162, initiation and termination of oil flow is controlled in the bearing groove of the crankpin bearing lower shell which does not carry the heavy thrust load. By using the diagonal split and favorable positioning of the cylinder banks the bearings and connecting rods can be readily disassembled when necessary. Similarly, the V-engine provides asymmetrical timing of the lubrication oil flow through the crankpin bearing to the spray orifice. The crankpin bearing operates as a rotary valve to control the flow of lubricating oil to cool the underside of the piston with an increase in cooling with an increase in speed.

The embodiments of the invention in which an exclusive property or privilege is claimed are defined as follows:

1. A hydraulic lubricating and cooling system comprising, a crankshaft, at least one main bearing rotatably supporting said crankshaft and defining an oil groove, a source of pressurized oil supplying pressurized oil to said main bearing, at least one crankarm having a crankpin on said crankshaft, a connecting rod having a crankpin end defining a crankpin bearing journaling said crankpin, said crankpin end defining an oil groove forming an arcuate segment adjacent said crankpin on the side of said connecting rod, a piston, a wrist pin onnected to said piston, a wrist pin end on said connecting rod defining a wrist pin bearing receiving said wrist pin on said piston and forming an oil groove and an oil orifice for spraying oil on the underside of said piston, means defining a passage in said crankarm of said crankshaft intermittently communicating between said source of pressurized oil through said main bearing and said oil groove of said crankpin bearing during a period of asymmetrical timing relation of the crankarm fore and aft of the top dead center position, passage means in said connecting rod for transmitting pressurzed oil from said oil groove in crankpin bearing to said oil groove and said oil orifice in said wrist pin bearing, means in at least one of said bearings defining a rotary valve to provide asymmetrical intermittent flow of pressurized oil from said main bearing to said orifice when the inertia forces on the oil in said passages of said connecting rod tend to increase oil flow through said orifice for thereby cooling said piston with a flow rate increasing with engine speed.

2. A hydraulic lubricating and cooling system as set forth in claim 1 wherein said connecting rod defines a two partite crankpin bearing having a split diagonal to the longitudinal axis of the rod.

3. A hydraulic lubricating and cooling system as set forth in claim 1 wherein said crankpin bearing defines a two partite bearing having a split normal to the longitudinal axis of said connecting rod.

4. A hydraulic lubricating and cooling system as set forth in claim 1 wherein said main bearing defines two bearing shells, means in only one of said shells defining said oil groove.

5. A hydraulic lubricating and cooling system as set forth in claim 1 wherein said main bearing defines said oil groove extending for an arcuate segment of the periphery of said main bearing.

6. A hydraulic lubricating and cooling system as set forth in claim 1 wherein said crankpin bearing defines a continuous surface on the portion of the bearing surface carrying the gas thrust load.

7. A hydraulic lubricating and cooling system as set forth in claim 1 wherein said crankpin bearing defines said oil groove for an arcuate segment of the periphery of said crankpin bearing for for the periof of asymmetrical timing of communication between said main bearing and wrist pin bearing for a substantially greater degree of crank rotation after top dead center than before.

8. A hydraulic lubricating and cooling system as set forth in claim 1 wherein said main bearing defines two bearing shells, said main bearing defines said oil groove for an arcuate segment for the full 180° of one of said bearing shells, said passage means in said crankshaft defines a diametric hole in communication with said crankpin bearing to thereby provide continual communication from said main bearing to said crankpin bearing.

9. A hydraulic lubricating and cooling system as set forth in claim 1 wherein said means in at least one of said bearings defines said rotary valve initiating communication between said main bearing and said orifice approximately 40° before top dead center.

10. A hydraulic lubricating and cooling system as set forth in claim 1 wherein said means in at least one of said bearings defines said rotary valve initiating communication between said main bearing and said orifice at approximately top dead center.

11. A hydraulic lubricating and cooling system as set forth in claim 1 wherein said oil groove in said crankpin bearing defines an arc of approximately 90° to provide communication between said main bearing and said orifice for approximately 90° of crankshaft rotation.

12. A hydraulic lubricating and cooling system as set forth in claim 1 wherein said oil groove in said crankpin bearing defines an arc of approximately 180° to provide communication between said main bearing and said orifice for approximately 180° of crankshaft rotation.

13. A hydraulic lubricating and cooling system as set forth in claim 1 wherein said oil groove in said main bearing defines an arcuate groove for the full 360° to provide continuous communication between said main bearing and said crankpin bearing.

14. A hydraulic lubricating and cooling system as set forth in claim 1 wherein said crankpin bearing includes two connecting rods, a first connecting rod for operating in the left bank of a V-engine, a second connecting rod for operating in the right bank of a V-engine, said passage means in said crankshaft defining passages for connecting said main bearing to said first and said second connecting rods in said crankpin bearing.

15. A hydraulic lubricating and cooling system as set forth in claim 1 wherein said passage means in said connecting rod defines a diagonal passage diagonal to the center line of said rod, said crankpin bearing defines said oil groove for an arcuate segment on one side of said crankpin bearing of said rod in communication with said diagonal passage, said rod defining said diagonal passage connecting said oil groove on the opposite side of said wrist pin bearing of said rod to thereby provide communication between said wrist pin bearing and said crankpin bearing.

16. A hydraulic lubricating and cooling system as set forth in claim 1 wherein said crankpin bearing includes two connecting rods, a first connecting rod adapted for operating in the left bank of a V-engine, a second connecting rod adapted for operating in a right bank of a V-engine at 90° relative to the said first connecting rod, each of said connecting rods defining a crankpin two partite bearings defining a slit at at 45° angle with the longitudinal axis of its mating connecting rod and substantially in a horizontal plane.

* * * * *